June 23, 1970     M. A. MARRONI ET AL     3,516,091
OMNIDIRECTIONAL JOINT

Filed Oct. 7, 1966     2 Sheets-Sheet 1

INVENTORS
MICHAEL A. MARRONI
JOHN C. HARDY
MARK E. BAKER
BY Norman Friedland
ATTORNEY June 23, 1970  M. A. MARRONI ET AL  3,516,091
OMNIDIRECTIONAL JOINT
Filed Oct. 7, 1966  2 Sheets-Sheet 2

United States Patent Office 3,516,091
Patented June 23, 1970

3,516,091
OMNIDIRECTIONAL JOINT
Michael A. Marroni, San Jose, Calif., and John C. Hardy, Weatogue, and Mark E. Baker, Winsted, Conn., assignors to United Aircraft Corporation, East Hartford, Conn., a corporation of Delaware
Filed Oct. 7, 1966, Ser. No. 586,329
Int. Cl. B63c 11/04
U.S. Cl. 2—2.1                                            3 Claims

ABSTRACT OF THE DISCLOSURE

A cord restraint system for pressurized suit includes axially spaced circumferential convolute roots spaced about the axis of rotation of a limb which carry a plurality of restraint sets. Each set includes a cord movable relative to points of attachment which extend from points above and below the bending axis and are in pairs each of which are diametrically opposed on the respective convolute roots and each pair being circumferentially spaced 90° from each other. The cord is serially laced through each point of attachment.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to joints for pressure suits and particularly to omnidirectional joints which are made from "soft" or nonrigid materials.

Pressurized suits designed for space or high altitude aircraft use must have flexible joints corresponding to the human joints of the wearer to permit freedom of movement of the body and limbs. These joints should be relatively easy to move, should allow a sufficient degree of freedom, and should conform to the human anatomy so as to prevent pressure points from developing when the suit is inflated. A pressure point being irritating local contact between an inflated pressure garment and the subject wearing the suit.

There are two types of joints currently being developed. The so-called hard joint which contains elements which are rigid when unpressurized and the so-called soft joint which is relatively soft and flexible when unpressurized and becomes hard only when pressurized. This invention relates to soft joints.

One of the deficiencies of the soft joints in use prior to applicant's invention was the tendency for the joint to be unstable in certain positions. When some prior types of joints are bent there is a strong tendency for the joint to continue to bend until one side of the joint is completely extended and the other side collapsed. These joints are stable only in a full bent position in either direction and are relatively unstable in any position between these two extremes. When held in the flexed or straight position there would be a strong tendency for the joint to move to one of these extremes. Other prior types exhibit instability toward neutral, that is a strong tendency to return to the unflexed position. This is undesirable since the subject must continually exert a force to hold the joint in any particular operating position. In the case of an elbow joint the subject's arm would tend to go to one of the stable positions while the subject was attempting to hold it in a flexed position. Applicant's joint is relatively stable in all normal operating positions. Many of the previous joints were not omnidirectional. Their movement was limited to a single plane. Our joint is truly omnidirectional.

It is an objecte of this invention to provide an omnidirectional joint for a pressure suit.

It is a further object of this invention to provide an omnidirectional flexible suit joint which can be moved relatively easily in any direction and which will be stable in any position.

It is a further object of this invention to provide an omnidirectional joint for a pressure suit which is twistable.

Another object of this invention is to provide a pressure suit joint which is completely soft in the unpressurized condition.

Figure 1:
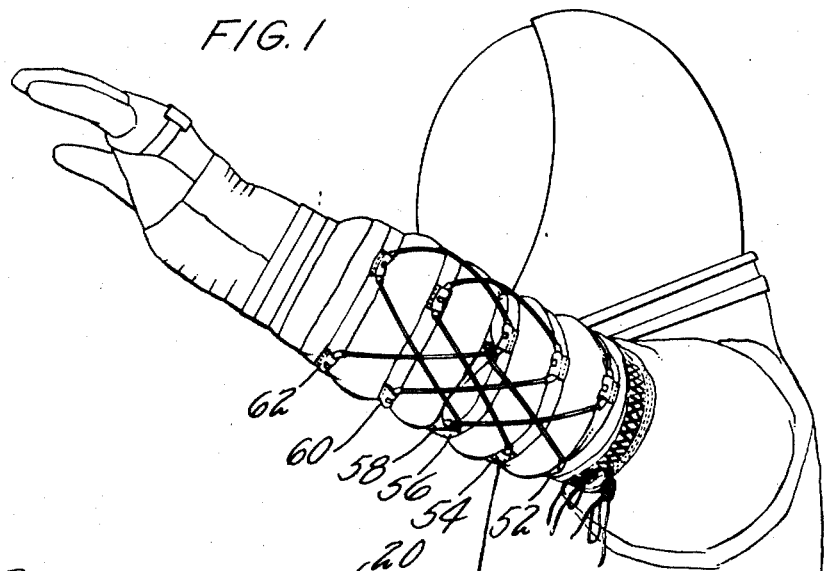
FIG. 1 is a pictorial representation of an elbow joint embodying our invention.
Figure 2:
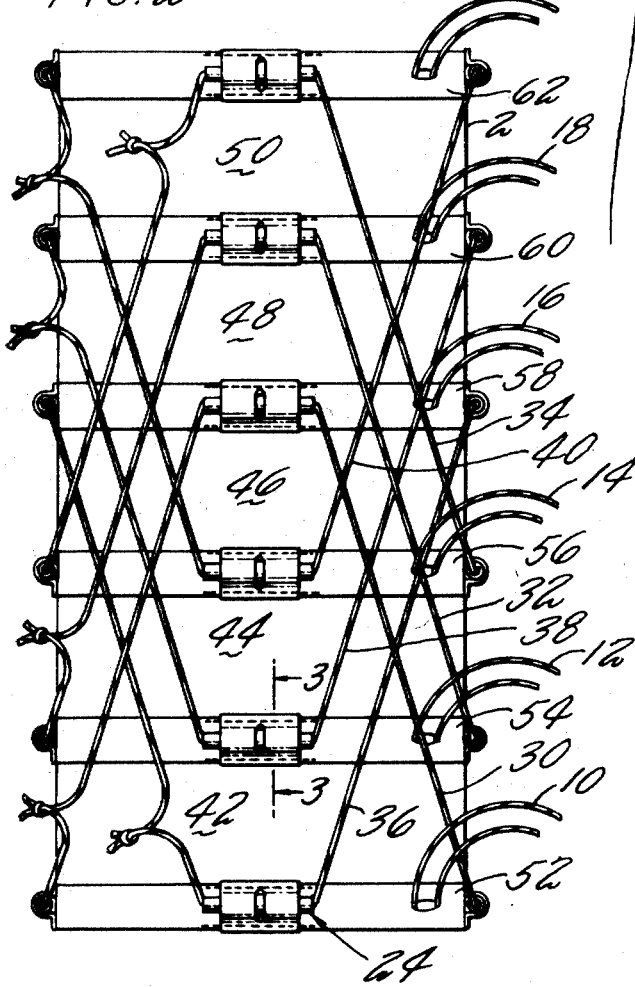
FIG. 2 is a schematic representation of the elbow joint shown in FIG. 1 in an unpressurized, unlaced condition.
Figure 3:
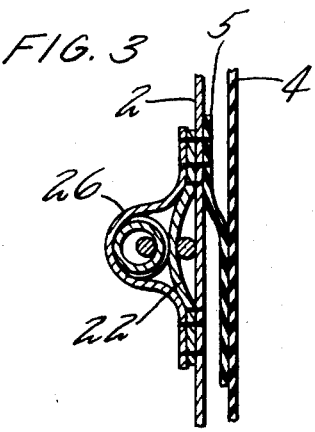
FIG. 3 is a cross section taken through section 3—3 of FIG. 2.
Figure 4:
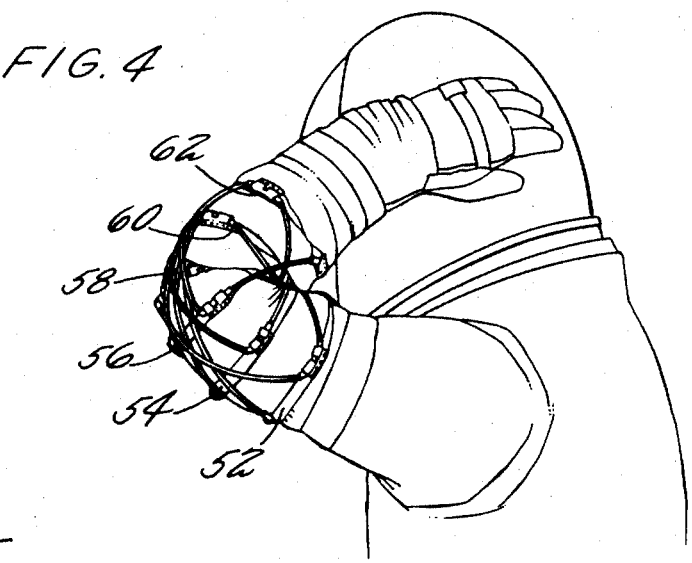
FIG. 4 is a pictorial representation of the elbow joint of FIG. 1 shown in a bent or flexed position.

FIGS. 2 and 3 show construction details of an elbow joint embodying this invention. FIG. 2 shows the elbow joint in an unpressurized, unlaced condition. It includes a flexible fabric tubular member 2 and a slightly larger gas impervious tubular bladder 4 which retains the gas in the suit. The inner bladder 4 is slightly larger than the outer fabric 2 so as to prevent stretching of the inner bladder when the suit is inflated. Short tubular bladder tapes 5 have one end cemented to the bladder and the other end sewn to the fabric tube to limit relative movement between the bladder and the fabric tube. A series of axially spaced restraint cords 10, 12, 14, 16, 18 and 20 circumscribe the tube. These cords are held in their axial position by tunnel tapes, of which 22 is representative, which is sewn to the outer periphery of the cloth. The end of the restraint cords extend through a hole in the tunnel tape and can be externally tied so as to locally reduce the diameter of the tube, thereby creating a series of convolutes, or bending lines, along the length of the tube as shown in FIGS. 1 and 4. The restrained sections along the length of the tube are sometimes called convolute roots. Four equally spaced cord guide members 24, or ferrules, are attached to the circumference of the tube at each tunnel tape position. These guide members are low friction elastomer ferrules which are held in place by fabric retaining members 26 which are sewn directly over the tunnel tapes.

What has been described so far is a tubular member which is restrained only in a circumferential direction. Without any axial restraint, the tube, when inflated as part of a space suit, will become elongated to its maximum length and the fabric or cloth will be under high axial loads and will resist bending. To limit the axial loading of the fabric and to obtain the objects described above, the axial restraint system as shown in FIGS. 1 and 4 is applied to the joint. It will aid in the understanding of the joint if the reader will keep in mind the fact that the joint when inflated is always seeking to expand to the largest possible volume and that it must always be restrained so as to maintain the desired characteristics and size.

The axial restraint system consists of a series of six cords: 30, 32, 34, 36, 38 and 40 which are adjustable in length and which control the spacing between the various convolute roots which they interconnect. For the sake of the following discussion, the convolutes are numbered 42, 44, 46, 48 and 50 while the root sections are numbered 52, 54, 56, 58, 60 and 62. The axial restraint system can best be understood by referring to FIGS. 1, 2 and 4. Assuming root 52 is a fixed reference, it will be apparent that the root 58 is restrained by the cords 30 and 36. These cords limit the distance between root 52 and root 58 when the suit is inflated. The distance between root 62 and root 56 is limited by the restraint cords 34 and 40. When the suit is inflated the length of these cords will control and determine the distance between these root sections. There is no restraint between root 56 and root 58 and when the suit is inflated the tension in cords 30 and 36 acting opposite to the tension in cords 34 and 40 will force convolute 46 to become compressed or collapsed as shown in FIG. 1. This partially collapsed convolute provides the excess material which is essential for the sharp bend this joint must make when incorporated in a space suit as an elbow.

Cords 32 and 38 control the distances between intermediate roots 54 and 60. These cords help to stabilize the system but do not take a significant part of the combined plug, or axial load, which the joint is subject to.

Reference is now made to FIGS. 1 and 4. As stated above, our invention provides a joint which is stable in most positions and which can be moved easily. A major factor in the amount of effort which is necessary to bend a joint is the amount of volume decrease which occurs when the joint is bent. This has long been recognized by those skilled in the art. The greater the decrease in volume when a joint is bent, the greater will be the force necessary to bend the joint. Another factor involved in the effort necessary to move a joint is the resistance or friction of the joint itself. In our invention, this friction is primarily friction between the restraint cords and the guide members, or ferrules. A joint will remain in a position in which it is placed without the necessity to supply force to hold it in that position only when the internal static frictional force necessary to move the joint is greater than the pressure forces tending to enlarge the joint and increase its volume. The volume change involved in bending a joint made according to our invention is sufficiently small when compared with the internal friction of the joint, so as to cause the joint to be stable in almost any position in which it is placed. This means that a subject wearing a suit which includes an elbow embodying our invention can bend his elbow and place it in one position and then relax his arm without having the restoring forces of the joint cause his arm to spring out to a straight position or to a fully closed position. This is important in reducing the amount of energy necessary to perform tasks while wearing a space suit. Additionally, it gives the subject a movement which feels natural when working in a zero gravity environment.

Figure 5:
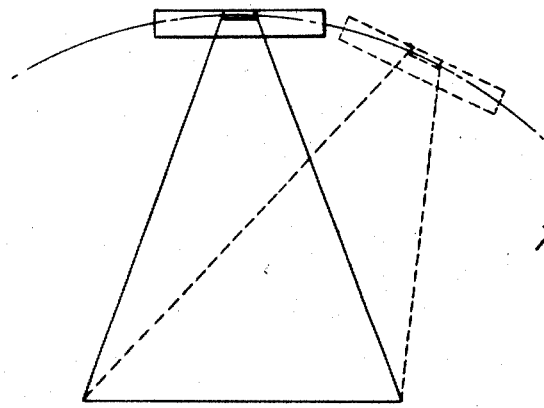
FIG. 5 is a schematic showing part of the restraint for a single convolute.

When the elbow joint shown is flexed as shown in FIG. 4 there must be relative movement between the ferrules and the restraint cords. Due to the four point restraint system which is embodied in this invention, there is very little cord movement and therefore very little friction in moving the joint. Rather than having the cords move through the four ferrules, there is a tendency for the cords to remain stationary and for ferrules to move along the cords. This is shown in FIG. 5.

Because of the relatively flattened and collapsed position of the middle convolute, there is a strong tendency for the joint when flexed to bend around this convolute as shown in FIG. 4. When this joint is used as an elbow joint, this feature is extremely helpful since the rate of bending at the center of the elbow joint is great and it is important that a sufficient amount of material is available along the outside of the elbow to allow for this large expansion when the elbow is flexed.

An examination of FIG. 4 reveals the importance of having the joint somewhat shortened when it is completely laced up. When the joint is flexed, the distance along the outside edge of the joint increases and unless the initial straight length of the joint is decreased, there will not be sufficient material to flex the joint without stretching any fabric. It is important that the material, or fabric, of the tubular member not be stretched at any time due to flexing since the forces required to stretch the material are extremely large compared to the forces necessary to bend the joint when it is in a convoluted form.

Since this joint is made up of soft flexible materials and twistable cords, the joint can be twisted or rotated about its axis in either direction. This twisting is limited, however, by the amount of excess fabric available in the axial direction which must deform when the joint is twisted. This ability to twist is extremely useful in suit joint and particularly in joints such as the elbow and wrist. Prior convoluted joints, without bearings, utilizing two cables down the side as a restraint are capable of almost no twisting since the restraint cables are of fixed length and it is almost impossible for a human subject to produce enough rotational torque associated with the foreshortening of the joint when the fixed length cables are moved from their purely axial position. In our joints, the joint rotation is limited by the amount of excess fabric available in the axial direction rather than by the restraint system. As the joint twists the ferrules and cords will move with respect to each other, but they will not prevent twisting of the joint.

Figure 6:
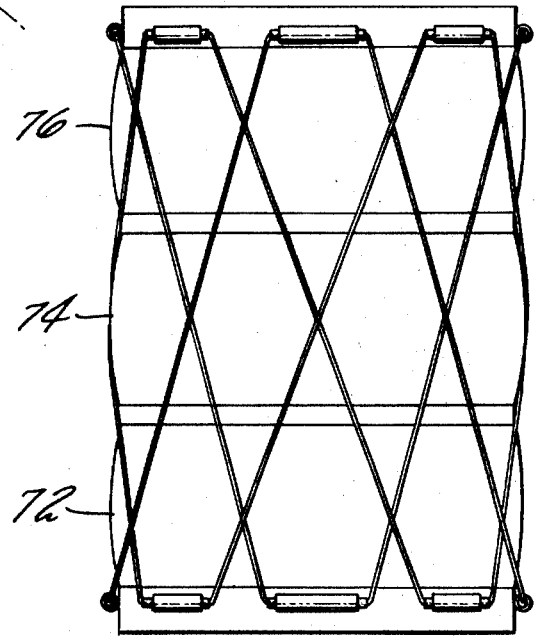
FIG. 6 is a schematic showing this invention embodied in a wrist joint.
Figure 7:
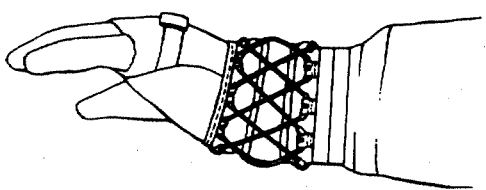
FIG. 7 is a pictorial representation of the wrist joint.

FIGS. 6 and 7 show our invention embodied in a wrist joint. The construction of the wrist joint is similar in many respects to the construction of the elbow joint described above and therefore the description of the wrist will be somewhat less detailed. As with the elbow, a flexible fabric tubular member is formed into a convoluted configuration by a series of axially spaced circumferential cords which form the convolutes 72, 74 and 76. Although a convoluted construction is shown here, it has been found that it is not essential to form convolutes along the length of the wrist joint since it is an extremely short joint and the axial restraint cords are a sufficient control for the joint. It has been found inconvenient for glove donning and doffing to construct the wrist joint with a separate inner bladder and therefore a neoprene bladder is cemented to the fabric tubular member to make it air tight and to minimize internal excess material.

The restraint system for the wrist is identical to the restraint system between any two of the root portions of the elbow joint except that twice as many ferrules and restraint cords are used to improve omnidirectional torque uniformity.

We claim:
1. An omnidirectional joint mounted in proximity to the axis of rotation of the limb of the wearer for pressurized suits comprising:
  a flexible gas impervious tubular member for enclosing said limb;
  first and second cord reversing guide members attached to the opposite outside surfaces of the tubular member at one axial position spaced upwardly from said axis of rotation and movable with the impervious tubular member when the joint is flexed;
  third and fourth cord reversing guide members attached to the opposite outside surfaces of the tube at a second axial position spaced downwardly of said axis of rotation, said third and fourth guide members being angularly spaced approximately 90° from the first and second guide members and also movable with the impervious tubular member when the joint is flexed; and
  a continuous restraint cord laced between all of said guide members to limit the axial expansion of said tube, said cord forming a path through said first, third, second and fourth cord reversing guide members as it circumscribes the tube.

2. An omnidirectional joint for a pressure suit comprised of:
  a flexible gas impervious tubular member for enclosing a human joint;
  a first, second, third and fourth axially spaced circumferential restraint member for locally limiting the maximum diameter of the tubular member and forming break lines along the joint when inflated;

a first cord restraint system limiting the distance between the first and third circumferential restraint members to less than the unrestrained distance between these members; and a second cord restraint system limiting the distance between the second and fourth circumferential restraint cord whereby the section of the tubular member between the second and third circumferential restraint cord will tend to collapse in an axial direction when the joint is inflated.

3. An omnidirectional joint for pressurized suits comprising:

a flexible gas impervious tubular member for enclosing a human joint;

a first, second, third, and fourth equally spaced cord reversing guide members attached to the outer surface of said tubular member at one axial position along the tube;

a fifth, sixth, seventh, and eighth cord reversing guide members equally spaced around the outer surface of said tubular member at a second axial position, said fifth guide member being aligned with said first guide member;

a continuous restraint cord laced between said second, fifth, fourth and seventh guide members in turn as said cord circumscribes the tubular member;

a second continuous restraint cord laced between said first, sixth, third and eighth guide members in turn as said second cord circumscribes the tubular member.

References Cited

FOREIGN PATENTS 977,172  12/1964  Great Britain.

VERLIN R. PENDEGRASS, Primary Examiner